United States Patent
Subbloie et al.

(10) Patent No.: US 11,824,351 B2
(45) Date of Patent: Nov. 21, 2023

(54) FACILITIES GRID MICRO DEMAND RESPONSE SYSTEM

(71) Applicant: Budderfly, Inc., Shelton, CT (US)

(72) Inventors: Albert Subbloie, Orange, CT (US); Christopher J. DeBenedictis, Branford, CT (US); Kenneth Buda, Scarsdale, NY (US); Jaan Leemet, Aventura, FL (US)

(73) Assignee: Budderfly, Inc., Shelton, CT (US)

( * ) Notice: Subject to any disclaimer, the term of this patent is extended or adjusted under 35 U.S.C. 154(b) by 140 days.

(21) Appl. No.: 17/556,676

(22) Filed: Dec. 20, 2021

(65) Prior Publication Data

US 2022/0200278 A1 Jun. 23, 2022

Related U.S. Application Data

(60) Provisional application No. 63/130,032, filed on Dec. 23, 2020.

(51) Int. Cl.
| | |
|---|---|
| *H02J 3/14* | (2006.01) |
| *H02J 3/00* | (2006.01) |
| *G05F 1/66* | (2006.01) |
| *G06Q 50/06* | (2012.01) |
| *G05B 13/02* | (2006.01) |

(52) U.S. Cl.
CPC .......... *H02J 3/144* (2020.01); *G05B 13/0265* (2013.01); *G05F 1/66* (2013.01); *G06Q 50/06* (2013.01); *H02J 3/003* (2020.01); *H02J 2203/20* (2020.01)

(58) Field of Classification Search
CPC ...... G05B 13/0265; G05F 1/66; G06Q 50/06; H02J 3/003; H02J 3/12; H02J 3/14; H02J 3/144

See application file for complete search history.

(56) References Cited

U.S. PATENT DOCUMENTS

| | | | | |
|---|---|---|---|---|
| 8,674,527 | B2 * | 3/2014 | Fyke | H02J 15/00 290/1 R |
| 10,523,449 | B2 * | 12/2019 | Montalvo | H04L 12/2803 |
| 10,916,968 | B2 | 2/2021 | Subbloie | |
| 11,625,058 | B2 * | 4/2023 | Forbes, Jr. | H02J 3/38 700/295 |
| 2013/0253721 | A1 * | 9/2013 | Parsons | H02J 3/14 700/295 |
| 2021/0097565 | A1 | 4/2021 | Subbloie et al. | |

FOREIGN PATENT DOCUMENTS

| | | | | |
|---|---|---|---|---|
| CA | 2609344 A1 * | 12/2006 | | H02J 3/32 |
| DE | 19842043 A1 * | 3/2000 | | H02J 3/14 |
| WO | WO-2005015366 A2 * | 2/2005 | | G01R 21/133 |

\* cited by examiner

*Primary Examiner* — Crystal J Barnes-Bullock
(74) *Attorney, Agent, or Firm* — ST. ONGE STEWARD JOHNSTON AND REENS

(57) ABSTRACT

A system and method for dynamically and automatically adjusting the load on a power grid through micro adjustments of equipment coupled to the consumer side of the power grid. The system allowing for the automatic adjustment of equipment to either decrease or increase instantaneous power demand on the grid in response to peak demands and demand valleys to smooth the demand curve on the power grid. The system able to balance demand within the grid to adjust demand within various different portions of the power grid and allowing for reducing the power buffer supplied by electric utilities to reduce waste and carbon emissions.

16 Claims, 6 Drawing Sheets

FACILITIES GRID MICRO DEMAND RESPONSE SYSTEM

FIELD OF THE INVENTION

A system and method for controlling power generation in connection with real time micro-adjustments to energy consumption on a power grid based upon real time demand. More particularly, the system and method are directed to managing equipment and devices connected to a facility electrical distribution system that is in turn, connected to a power grid.

BACKGROUND OF THE INVENTION

Power generation and distribution companies (i.e., electrical utilities) operate a complex network of power generation facilities, transformers, and power distribution grids to deliver reliable power to users whether they be industrial, commercial or residential customers.

To provide reliable power distribution, electrical utilities typically run a variety of generators (e.g., oil, diesel, natural gas, etc.) to generate electricity. The number of generators running at any one time will depend on the current power demand on the electrical grid. Electrical utilities can turn on additional generators when demand rises. Failure to provide adequate power output on the grid can result in a lowering of the voltage on the grid which is known as a brown out. If demand goes too high relative to the ability of the electrical utility to provide electrical power on the grid, this can result in a blackout where the grid shuts off. Rolling blackouts result when portions of the grid are disconnected because there is inadequate power to meet the total demand on the power grid.

Utility companies go to great lengths to try and predict demand to avoid brownouts or blackouts. For example, during the summer utility companies expect higher electricity usage due to increased running of HVAC equipment. In addition, commercial demands for electricity during a hot summer day are expected to be larger during normal working hours as opposed to nighttime hours when thermostat settings are raised such that HVAC equipment runs less frequently. A variety of other fluctuations can be predicted with somewhat reasonable accuracy so that the electrical utilities typically know how many generators need to be running at any one time to adequately power the grid.

While electrical utilities have become good at anticipating electrical demand on the grid, there are times when instantaneous demand can spike. As unexpected spikes in demand do occasionally happen, electric utilities run their generators such that a buffer is provided to absorb the unexpected demand spikes. In other words, if the predicted demand is for example, 60% of a generator's capacity, the generator may be run at 65% where the oversupplied 5% power is shunted through an impedance to dissipate the excess power generated. In this situation then, any excess power generated is simply wasted and is chalked up to a cost of doing business to ensure adequate power is always available. Alternatively, if the actual demand is 62%, the oversupplied 3% power is shunted through the impedance. In this case, when the demand raises (e.g., the 2% demand increase), the additional 2% demand would be absorbed by the buffer such that no change in service to the grid occurs resulting in reliable power output. The buffer is therefore present for the fundamental reason that prediction only can go so far and that there needs to be a safety factor built into the grid to avoid brownouts, blackouts, or rolling blackouts.

It should be noted that the power shunted through impedance is not sold and is basically wasted. The utility has spent money to generate this power but since the demand was not there it is thrown away. There is presently no good way to store it for later use.

By use of impedance shunts, unexpected demand or variances in demand can be responded to virtually instantaneously as power can be diverted from the impedance shunt to the grid as needed in real time. In contrast, if the buffer provided to absorb instantaneous demand is not large enough, it takes time to turn on and bring up to speed additional generators to meet the increased demand, which can result in power fluctuations on the grid and can be very costly to the electric utility.

To avoid the need to turn on and bring up to speed additional generators, electric utilities utilize demand response to lower instantaneous demand. This process involves the electric utility paying a utility user to be available when called to reduce or scale back their electrical usage in response to a request from the electric utility. This is most often implemented during times where the electrical grid is approaching its current generation capacity. In one example, if an electric utility sees that instantaneous demand is approaching the limit of the grid, they can call a facilities manager on their list and ask the manager to shut down or adjust downward the operation of various equipment (e.g., HVAC equipment) at the facility. They can call numerous facilities making similar requests, which will result in lowering the electricity usage from those facilities easing the pressure on the power grid. Demand response in effect, lowers the instantaneous demand on the grid by lowering the electricity usage at facilities. Utility companies will often pay commercial or industrial consumers for demand response capabilities. This is because it is more cost efficient to pay these customers to curtail their usage than it is to have to unexpectedly turn on and run additional power generators. While helpful, demand response still has a fundamental problem namely, power predictions by the electric utility could be wrong. This could result in excessive amounts of power being reserved and the electric utility paying for more demand response availability than is needed. This problem is caused in part because demand response is not instantaneous as manual adjustment of equipment located all over a facility or site can take time to implement. As such, electric utilities often give anywhere from very short time frames to 24 hours advance notice. The more instantaneous response is required to be, the higher the premium paid by the electric utility to the consumer. The consumer agreeing to provide demand response, will often be paid a monthly fee to make the response available, regardless of whether the response is used during the billing period. Demand response is often implemented on a sub grid level. What this means is that often a particular portion of the power grid may be overloaded. To address the overload, demand response events will often be requested in particular locations within the power grid seeing the overload whereas the remaining sub grid areas may not be experiencing any problems.

Thus, while demand response provides some ability for the utility to "control" power usage on the power grid, it is often limited to a utility request to a particular facility and that facility responding by reducing power during the requested timeframe. Because the amount of demand that needs to be shaved off is typically relatively large, only the largest consumers are used for demand response. However, the adjustment of power consumption in different portions of the power grid may be difficult to achieve if the large users in the demand response program are not located in that portion of the power grid.

Another issue faced by electric utilities relating to providing a buffer (e.g., 5% over demand) is that the buffer comprises wasted power. For example, when a peak demand is calculated and the buffer is set at 5% above the peak demand, that 5% is shunted through an impedance, which functions to dissipate the excess power. For example, if the overall generation scheme for Manhattan is at 60% of capacity, the 5% buffer still is needed to ensure that fluctuations in demand are accounted for and reliable power supply is delivered without brownouts. Since the electric utility does not have control over the power consumption on the power grid beyond requesting from select consumers that they curtail their consumption or instituting rolling blackouts, that safety factor (buffer) must be maintained. The cost of maintaining that safety factor is quite large when considering the margins for profit in view of pressure to keep utility rates low for consumers, the increase in the cost of fuel to run the power generation equipment, and the growth of metropolitan areas that put further strain on electric utilities as well as the proliferation of electronic equipment and vehicles that must be powered and/or charged.

Therefore, it is desirable to provide a system and method for reducing the magnitude of the buffers needed by power generation plants by allowing increased control of power demand events thereby to reducing running costs.

It is also highly desirable to provide a system and method allowing for better real time control of demand events in targeted locations within a power grid.

It is still further desired to provide a system and method that allows for direct and very small (micro) adjustments to the operation of equipment in consumer facilities to provide real time power reduction during demand events as well as augmentation in times when excess power is available such as adjusting the timing of the operation of certain equipment to take advantage of dips in energy usage across the grid.

Consumers rely on stable and consistent electricity availability sufficient to meet instantaneous demand. Electric utilities employ a power buffer of surplus energy to achieve this goal. However, there is a relatively large operating cost to keep a buffer of instantaneous power available. This cost is directly related to the burning of coal or other fossil fuels to run generators that generate the buffer power capacity. To compound this issue, the more variable the load on the power grid, or the more difficult it is for the electric utility to estimate power consumption needs and therefore a larger the buffer must be maintained, which leads to higher running costs that are passed on to the consumer.

The nature of electricity on the power grid does not allow for the storage of any unused portion of power. As such, any buffer electricity that is generated is lost to the utility. In a specific example, a turbine generating electricity may be driven at e.g., 5% above anticipated demand and this 5% "buffer" would be connected to a device which can dissipate the electricity. In contrast, turbines that are turned to generate electricity are not able to react quickly to changes in demand and take time to be brought safely bring up to speed. However, when instantaneous demand during a demand event occurs, additional electricity must be provided to the power grid in real time to avoid brownouts or even a blackout. The power buffer employed provides this instantaneous power during demand events.

If the utility underestimates the power needed, and does not have sufficient buffer available, as the power draw on the grid outstrips the ability of the utility to provide, a voltage sag (a brown out) will begin to appear on the grid, which can negatively impact or even damage some equipment connected to the grid. Alternatively, if the buffer provided is too large, the operating cost for the electric utility is driven up by the waste. As environmental awareness is heightened, it is further understood that burning fossil fuels to run power generation equipment needlessly adds to the carbon footprint of the electric plant. As such, it would be good to minimize the buffer required to minimize needless burning of fossil fuels.

SUMMARY OF THE INVENTION

While demand response methods exist today, these are typically only provided to large industrial plants and require advance notice and planning. None of these provide for automated power reduction, nor do they provide for coordination between diverse geographical locations. It would therefore be beneficial to have a system and method that can reduce the needed buffer, by providing near real time automated demand adjustment capabilities across the grid rather than slow, manual demand response methods to lower demand.

To reduce the magnitude of the buffer described above, the present system and method provides the utility company with increased control over electrical demands across the electric grid and the ability to absorb fluctuations in demand by modifying power demands on a real time or near real time basis. Allowing the electric utility to directly modify the operation of certain equipment in an automated fashion, allows the electric utility to lower or reduce the buffer maintained, which in turn lowers the amount of fossil fuels burned on wasted power generation. The electric utility can set a target power usage that is transmitted to the cloud-computing based software of the present invention, which in turn, will automatically determine how to divide up power reductions between a number of different facilities, while at the same time allowing targeted areas on the power grid to be reduced as needed. The determination of where to adjust for the difference between the target power and the current demand and will often be based on various facility profiles and identifying temporary changes that can be implemented across various facilities to reduce aggregate power demand or to reduce fluctuations in aggregate power demand.

Unlike manual peak shaving systems, overall power usage on the grid does not have to be reduced with the present invention. Rather, the current system allows for time shifting of instantaneous demand while at the same time allowing for a much smaller buffer to be maintained. Demand response systems typically seek to shed load to reduce peaks in instantaneous demand, but in the present system, demand would be turned on and incentivized by, for example, providing that power at a cheaper rate for actions that may be delayed to a later time but are set to happen in the near term anyways. From the utility standpoint, this power which would normally have been wasted (e.g., sent to an impedance as a buffer), can instead be sold.

Therefore, by automatically staggering various electricity demand events in a dynamic fashion, a more consistent peak can be obtained. For the electric utility, this means the needed electricity becomes more constant as fluctuations are reduced, which in turn reduces the amount of buffer needed to avoid brownouts, blackouts, and other negative effects from insufficient delivery of electricity. Thus, fluctuations can be reduced by actively adjusting loads across the power grid thereby reducing the need for a relatively large buffer since the fluctuations would be smaller.

Therefore, a need exists for a system that can orchestrate demand for energy usage in near-real time when the grid has surplus energy and to reduce demand at times when the load fluctuations on the grid are higher or are anticipated to be higher. Such a system would operate in or essentially in real time to adjust loading on the power grid. It should be noted that, while the buffer can be reduced, it could not be eliminated because instantaneous fluctuations on the power grid will occur as not all loads on the power grid would be connected to the system. Therefore, it is an object of the present invention to provide a system and method utilizing network controls and signaling to manage the electrical demand of equipment in a facility connected to the power grid.

It is a further object of the present invention to have such controls distributed widely in the end points of the distribution grid, namely at the consumer end of the power grid.

It is a further object of the present invention to have a centralized control system in communication with local facility controllers on each premises to communicate commands to various equipment to manage electricity demand.

It is a further object of the present invention to have the system employ artificial intelligence to learn the demand curves of the overall power grid and discrete portions of the power grid to be able to coordinate and manage the consumption of end point equipment to eliminate peaks in demand and maintain energy consumption as flat as possible across all portions of the grid more effectively.

It is a further object of the present invention to have a predictive model that can anticipate demand and actively control and schedule the operation of various equipment across the power grid.

It is a further object of the present invention to allow for individual equipment to be managed by either the facilities controller or the central management system directly.

It is a further object of the present invention to present a business model for a third party that is managing the dynamic power control system to be compensated for their buy-in, which can be measured in terms of the expanded operating range for the electric utility.

It is a further object of the present invention to allow for individual opt-in methods that determine the amount of participation the individual facilities will undertake in the compensation model. These levels can range from little to no participation, and thus no impact to the end users to maximal levels of participation entailing adjustments to all manner of devices at the facility actively throughout the day.

While virtually any equipment that consumes power could be adjusted according to the present system, among the types of equipment that would have the most impact include but are not limited to: smart compressors with defrost cycles and set point ranges; Heating Ventilation and Cooling (HVAC) system operation and setpoint ranges; smart lighting dimmers; variable speed motors; any other equipment that utilizes a variable electrical usage pattern that can be adjusted with minimal impact to allow for the smoothing of grid fluctuations in energy consumption.

In one aspect a method is provided by which a centralized control system can communicate with either end points or facilities controllers to actively manage and control the grid.

The method allows for the system to actively make required operational adjustments to anticipate and react to demand peaks and valleys to not overcompensate or over-react to requests. This would include a real time negotiation of how much peak or valley can be compensated for and micro adjustments as needed.

In other aspects, a system is provided which enables communication with and control of the end equipment allowing for the adjustment of both values and timing of certain electrical consuming activities, (e.g., timing of turning on compressors or starting defrost cycles).

In other aspects the system may allow for communication of potential savings and facilitate the ability to respond regarding available savings at the equipment/device level depending on the capabilities of the equipment/device. Not all equipment/devices will have the functionality to monitor and publish energy use or predicted use (e.g., smart equipment). In some cases, the facilities controller will be able to obtain this information through monitoring and measurements via independent sensors installed on the equipment.

In other aspects the system may allow for the communication of desired savings and a way of responding regarding available savings at a given facility by aggregating the individual capabilities of the equipment/devices at a facility or multiple facilities in each grid segment.

In other aspects the system may allow for energy providers to compensate third party energy management companies for providing them extended range of operation by smoothing the power curve (e.g., absorbing peaks and filling valleys of usage).

It is contemplated that numerous billing models could be used in connection with the above-described methods including but not limited to:

1) A standby ability of KwH that can be absorbed or shed at any given time. This could be managed separately in terms of both peak and valley capabilities. Varying levels of compensation could be established for time of day/week/year etc.

2) A bid and auction method where individual facilities may allow dimming of lights for $'x' per hour at peak times and the electric utility pays on an as needed basis.

3) A simple model around Load Factor. The more the system balances load towards a steady demand, the more compensation is provided to a set amount.

In one configuration a system for dynamically adjusting load on a power grid is provided comprising a computer having a storage and connected to a network, and a plurality of control devices connected to the network and coupled to the computer, the plurality of control devices associated with equipment located at different facilities located geographically apart from each other and connected to the power grid, each facility having an electric metering device to measure an amount of electricity used at the facility. The system is provided such that software executes on the computer associating each of the plurality of control devices with equipment located at one of the different facilities and each control device is connected to an electric power line supplying electrical power to the equipment the control device is associated with such that a control device is capable of adjusting the power supplied to its associated equipment. The system is further provided such that software receives target instantaneous power usage (TIPU) data for the power grid from an electric utility computer that is indicative of a desired instantaneous power usage on the power grid, the TIPU data including a range of power consumption and the software receives actual instantaneous power usage (AIPU) data for the power grid from the electric utility computer, the AIPU data received on a real time or near real time basis by the computer. Finally, the system is provided such that the software executing on the computer transmits control signals to the control devices to modify electrical power usage of at least two pieces of equipment each piece of equipment located at different facilities, such that power usage on the power grid is modified according to the TIPU data and AIPU data.

In another configuration, a method to enable modification of a power generation buffer for a power grid by modifying power usage of a plurality of equipment located at a plurality of locations with a computer having software executing thereon and coupled to a network is provided where the method comprises the steps of coupling a first control device between a first piece of equipment at a first facility and a first electrical power distribution source coupled to the power grid, the first control device connected to the network and coupling a second control device between a second piece of equipment at a second facility a second electrical power distribution source coupled to the power grid, the second control device connected to the network. The method further comprises the steps of associating the first control device with the first facility and associating the second control device with the second facility and receiving target instantaneous power usage (TIPU) data for the power grid from an electric utility computer, the TIPU data indicative of a desired instantaneous power usage on the power grid, the TIPU data including a range of power consumption. Finally, the method comprises the steps of receiving actual instantaneous power usage (AIPU) data for the power grid from an electric utility computer, the AIPU data received on a real time or near real time basis by the computer, and automatically controlling the equipment associated with the first and second control devices according to the TIPU data and the AIPU data such that actual power usage on the power grid is modified to be maintained within the range of power consumption included in the TIPU data.

Other objects of the invention and its features and advantages will become more apparent from consideration of the following drawings and accompanying detailed description.

DETAILED DESCRIPTION OF THE INVENTION

Figure 1:
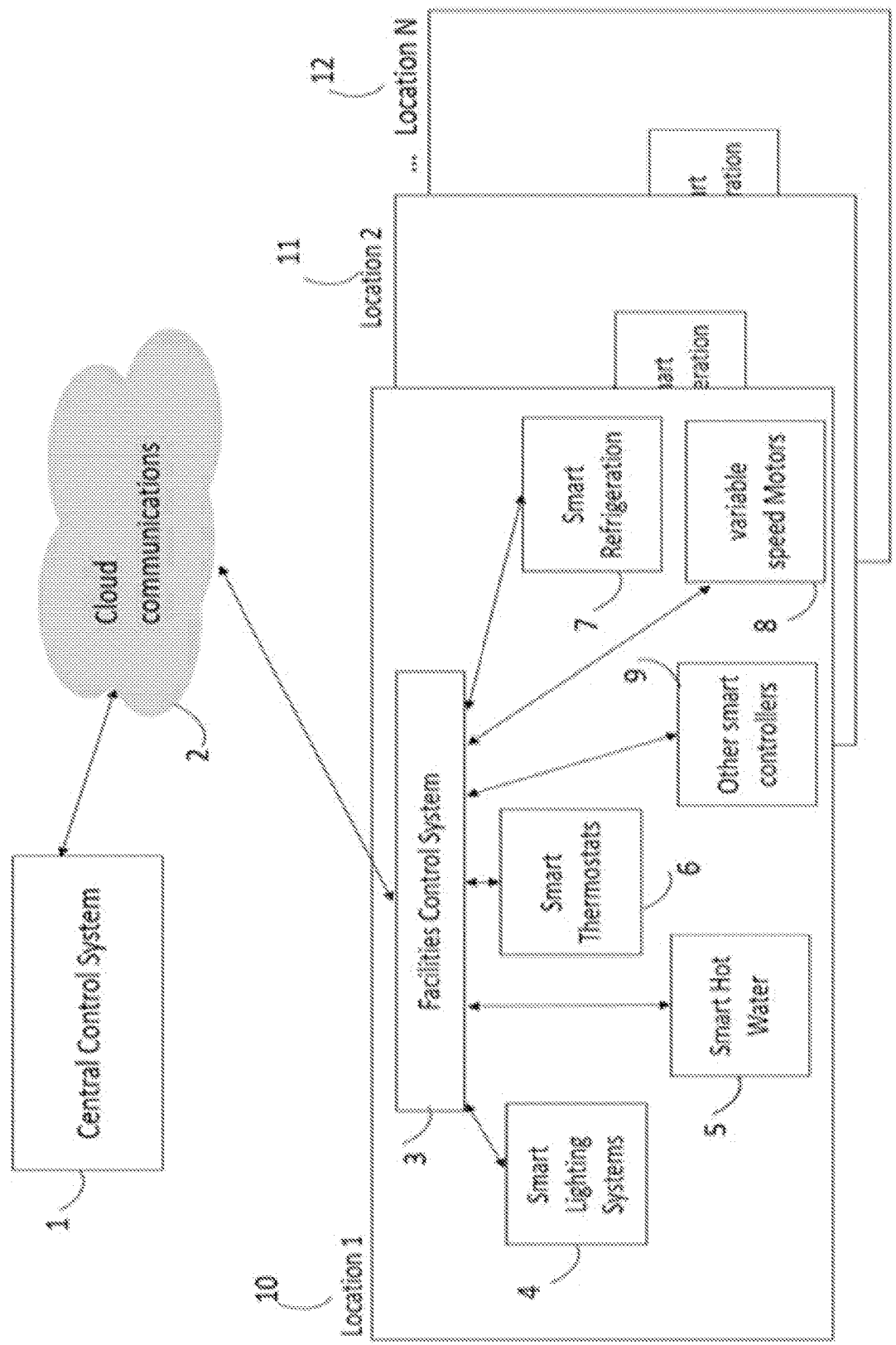
FIG. 1 is a functional overview of the components comprising the facilities grid.

The production of electricity often requires the use of large turbine generators powered by gas or steam. When these turbines turn, the rotational movement is used to spin a large magnet(s), which in turn creates a varying magnetic field that interacts with electrical wiring thereby causing electricity to be generated in an electrical circuit. This electricity is then provided to an electric grid to which homes and businesses are connected.

This transmission grid can be considered a network for distributing the generated electricity from multiple producers to multiple consumers. It comprises various switches, transformers, cables and distribution centers that are all interconnected into a macro power grid.

For further clarity, consider the flow of electricity from the generation plant, which creates the electricity from its turbines and transmits this electricity along transmission wires at high voltage. This part of the grid, considered the transmission grid, comprises high-capacity lines bringing this power to distribution centers. This part of the network typically includes various transformers to step up or step down the electricity so that it can be efficiently transmitted and used by consumers.

Stepping up the electricity to a higher voltage enables maximizing the amount of energy transmitted due to higher voltage and a corresponding lower current resulting in lower power losses, whereas stepping down the voltage allows for the voltage to be lower to a point that it is usable for consumer applications.

High voltage is typically stepped down to medium voltage at a distribution substation for distribution on neighborhood utility lines to end consumers and enterprises that are connected to the power grid. This side of the substation is referred to as the distribution grid. At the consumer location, the electricity is again stepped down to an appropriate level to be used by the consumer be that 480V/277V or 240V/120V. The point of the electric meter at the end consumer or enterprise is the end of the distribution grid and the beginning of the facilities grid.

The usage on the macro grid is typically fluid. The demands vary and grow over time requiring updates to the transmission grid and distribution networks as new end points are added. Further, the variability of electricity use as facilities are upgraded/expanded or as facility use changes can put a strain on the existing power macro grid. As the demand curve fluctuates based on the variability of demand coming from electricity consumers, the supply demand must also fluctuate. This is not an easy task when dealing with driving enormous turbines and transmitting high voltage electricity.

As demand across the power grid varies, larger spikes in demand are referred to as peaks. The greater these peaks, the greater the chance that the grid may destabilize and cause serious issues such as brownouts, overloaded transformers, or even blackouts. The added strain on transformers as they are overloaded can also reduce their overall lifetime and increase maintenance requirements.

Similarly, reduced consumption also appears on the grid and is referred to as valleys. These valleys can also be problematic for the grid as this indicates that too much power is being generated for the grid and must be disposed of. One way to respond to a valley is to slow down the turbine that is generating electricity to some degree, but there is a limit as to how much this can be done. For this reason, when in these power valleys, there is a need to dispose of unused power that has been generated.

This wasted power has a major cost to the utility due to the cost of the materials burned in coal or gas to turn the turbine. From an ecological point, there is also the unwanted and unnecessary generation of carbon emissions due to the generation of the wasted power. Typically, however, the electric utility must assume some level of waste to supply electricity to the power grid with confidence accounting for increases in instantaneous demand. This excess power is considered a "buffer" and is provided to allow for quick response in peak demand should it arise. An important aspect of the present invention disclosed herein is to allow for minimization of this buffer through alternate means of absorbing valleys and limiting peaks while at the same time providing enough power to the power grid.

This process of disposing of excess electricity can be done by shunting electricity directly to ground via an impedance. However, it is contemplated that some electric utilities could offer this excess energy to consumers at lower rates. Unfortunately, the typical peaks and valleys across regions are similar in timing and the demand for this excess power may be quite limited.

Some energy providers make use of this power in a way of attempting to store it for later use. In some cases, this can involve storing it in battery banks, but these are still expensive and quite limited in capacity.

Some pumped hydro-electric systems involve pumping water up a hill which can later be released to generate hydro power. Still other systems drive large trains up hills and use regenerative banking to recreate the power later.

There are other systems as well that consist of creating heat or momentum which can for a short period store excess energy that can be released and recaptured later.

Still other systems, called power to gas, have been implemented to create combustible fuels through electrolysis which produced hydrogen. All of these systems however, are quite inefficient and can be very expensive to install.

The peaks and valleys can be causes for concern for the electric grid operator as they can lead to destabilization and if not managed well, to total grid shutdown or equipment failure and outages requiring repairs. Even when managed, they put a large strain on the components in the power generation and distribution grids.

A turbine spinning at a constant speed creates the magnetic field needed to generate electricity. In an example where schools are let out at 3:30 pm, and factories start to shut down at 5 pm and people go home and turn on air conditioners and start cooking dinners, there is a shift in the amount of electricity used, and a shift on the grid as to where electricity is consumed.

The cycling and variability placed on equipment reacting to significant changes in electricity demand is hard on the system components and can lead to premature wear and maintenance. Electricity providers rate their customers based on a load factor, which is related to how consistent the demand for electricity is for a given customer. For example, a load factor of 1.0 or 100% is a perfect even consumption over time. In such a system the electrical demands always remain constant.

Load factor is a calculation of how much energy is used in each time period, versus how much energy would have been used if the power had been constant during the period of peak demand. The load factor percentage is calculated by dividing the total kilowatt-hours used during a period by the maximum demand in kilowatts (kW) multiplied by the number of hours in that period.

To calculate load factor, consider the following example. If the monthly consumption was 36,000 kilowatt-hours and the peak demand was 100 kW in a 30-day billing period. The Load Factor would be calculated as follows:

$$36,000 \text{ kWh} = 30,000 \text{ kWh} = 0.5$$

$$100 \text{ KW} \times 30 \text{ Days} \times 24 \text{ hrs/day} = 72,000 \text{ kWh}$$

This is more representative of a typical or average load factor in many cases. Most businesses do not operate 24/7 and use more power when they are operating. Similarly, most residential customers use less energy when sleeping or when absent from their homes. As such, loads tend to vary significantly.

In a situation where demand exceeds production, it may not be possible to increase electricity generation instantaneously. As such, electric utilities often have a separate plant, called a peak or peaker plant, to supply the excess demand at these peak intervals. These peaker plants, in addition to being expensive to build and deploy, are tightly controlled and must be kept running so that the energy needed can be provided essentially instantaneously. For example, these may be large diesel engines that are kept idling so that they can be brought online very quickly. There is a constant burning of fossil fuels to keep the engine idling, which leads to wasted energy and added pollution. This wasted energy is accepted to provide the necessary power buffer, to enable instantaneous peak power production on demand.

To minimize the need for these expensive and highly regulated peaker plants, electric utilities have developed pricing models designed to encourage users to distribute or limit their demand. These incentives include lowered electricity costs for after typical peak hours, or tiered usage levels. These can be somewhat effective, but for many these pricing differences are not sufficient to drive changes in demand. For example, running an evening shift at a plant may be more inconvenient and may even cost a company more than any electrical savings they may recoup.

Still further, the addition of green energy sources like wind and solar add capacity to the grid but these are by their very nature not ideal for a consistent supply of electricity. To some degree, the intermittent and inconsistent delivery of power from these sources even exacerbates the problem because, a power generation may be reduced based on added electricity generated by the green energy sources, however wind can quickly die down, or storm clouds could obscure the sun as demand is increasing causing an even larger variance between demand and supply that must be bridged by the turbine and peaker plants.

Other techniques that have employed are demand response systems. These are generally offered to very large electricity users such as factories or campuses with the idea that with some notice, these sites can provide reduced usage when peaks are expected. Demand response windows may be some hours long and may be predicted some days in advance. The end users are offered discounts to accommodate these windows when asked and face steep penalties if they do not conform. The users comply by manually adjusting the operation of various equipment. Due to their nature, these windows are typically known well in advance and are only used for extreme peaks such as the warmest days of the year. However, these types of systems are not designed for any instantaneous reactive control, and rather, are engaged as part of the predictive algorithms of the energy provider and in some cases may not even be needed.

While some attempts have also been made to provide such demand response participation at a consumer level, these generally involve only air conditioning and heating, and the end user is requested to minimize the use of these at the very times they are needed most, such as the warmest days of summer.

Another approach has been adopted which involves batteries to store excess electricity generated in valleys and apply this to the peaks when needed. These systems have been attempted both on the supply side as well as the distribution side. These battery systems are both expensive and inefficient due to the changing of power from AC as generated, to DC to store in the battery banks and then back to AC when needed again. Additionally, these battery banks have very limited capacity.

Still further, peaks and valleys also do not occur evenly over the whole power grid at any given time. A peak make be felt at one distribution point, and a valley at another. The delays in generating power and the inefficiencies of driving the power through the peaker plants to the points of distribution must also be factored into the ability to provide enough power for any potential peaks wherever they occur.

However, what may not be readily apparent is the ability to use a part of the existing grid directly for the elimination of these peaks and valleys with minimal impact and inconvenience to the end users through small micro adjustments of existing equipment that can be facilitated by fully automated remote control.

As an example, in one instance a commercial building may consume approximately 22.5 KwH per sq ft. and a food services establishment may consume approximately 56 KwH per sq ft. Micro adjustments could include the dimming of lights, the delay of defrost cycles, small and incremental adjustments to temperature setpoints in HVAC, and other minimally intrusive changes to equipment. Rather than a single large entity making large cutbacks to their energy consumption as part of a DR program, these small micro adjustments distributed among a relatively large set of users can add up to substantial energy reductions with little to no discernible impact for the consumers.

A further benefit can also be achieved by using the remote system to help manage valleys of usage and generate demand through the appropriate timing of activities where excess energy is available.

Take for example, a simple defrost cycle on a refrigerator or freezer. Such a cycle is energy intensive and involves heating an element to a high temperature to melt ice/frost on the cooling coils of the unit. These typical defrost cycles are run at predetermined fixed intervals, for example, every 6 hours. Newer equipment allows for the optimization of running of these cycles through frost detectors on the coils. In either case, it is not essential to run these cycles at precise intervals or times. In other words, these cycles can be moved up or delayed by several hours with little to no impact on equipment performance or lifespan. As such, a smart defrost controller can be selected to run a defrost cycle in any interval a few hours on either end of the ideal time to do so. In the event of a valley of usage where the utility is forced to dissipate excess electricity, these defrost cycles could be turned on to use that electricity allowing the utility to effectively utilize it.

While these methods for utilizing energy in energy valleys are helpful to the grid and energy providers, they may also be opportunities for users to obtain reduced energy costs or other incentives to use this available energy which would otherwise have been wasted. These incentives can offset the cost of the smart controllers.

From a user perspective, this earlier defrost cycle is not akin to the creation of unwarranted demand and does not drive more defrost cycles. This cycle would have run anyway, just a slightly later or earlier time. Once having run, the usual interval between cycles returns as the coils are defrosted. Parameters around how often these cycles can be run and how much time before and after the present cycle they can be changed are established as part of the control algorithms.

Similarly, during peak times where the energy provider wishes to limit peak electricity use, these smart controllers can be used to postpone or even skip defrost cycles to reduce energy consumption. The timing of the defrost cycle can also be coordinated with other equipment on the site so it does not come on at the same time as an HVAC cooling cycle, or a hot water heater cycle, and so on.

Consider now also the adjustment of setpoints on a thermostat by relatively small increments. These temperature setpoint adjustment can apply to an HVAC system used for heating and cooling a space, to a compressor used to cool a freezer, refrigerator, or icemaker, or to a hot water heater that is keeping a tank of water at a desired temperature.

Setpoints typically allow the temperature to fluctuate between two thresholds turning on cooling or heating as needed once a threshold is reached. For example, when considering an HVAC system, someone wanting to keep a space at a constant 70 degrees may have a cooling setpoint set to 72 and a heating setpoint set to 68. Setpoint ranges can be wider or narrower and these values are simply used for illustrative purposes. Going back to the example of cooling, once the temperature is measured to be at the end of the range, in this case 72, the cooling system will come on cooling the room to the desired temperature of 70. Similarly, in the case of heating, as the room cools to the end of the range of 68, the heating system engages and heats the room to the desired temperature of 70.

Smart thermostats allow the adjustment of these ranges and setpoint values and while these functions are typically used to adjust cycles for programming modes to accommodate situations where occupants are present or sleeping, the proposed system utilizes these setpoints in a more dynamic fashion.

It is difficult for most people to even detect a single degree of temperature change and this is especially so if changes are gradual. Time shifting these cooling cycles even when adjusting the setpoints by a few degrees can be achieved with minimal to no impact or inconvenience. Consider again the example of 100 air conditioning units cycling every ten minutes or so to achieve a +/−2-degree setpoint variance. It should be noted that many newer temperature sensors are set to cycle within one degree and thus cycle more quickly. In such a system it is likely that multiple units will be running at the same time. By staggering the operation of these units, the demand curve could be controlled and flattened. Further, electricity use is typically highest when the compressors first start up generating an initial spike of usage. As such, when running multiple compressors in the same time slot, staggering the start times of the compressors can also function to lower the peak demand.

The above management and prioritization system can be used to flatten the curves in peaks and valleys as well as to maintain a lower overall energy cost while also helping to eliminate waste. The traditional energy buffer as well as the traditional operating level of the energy supplier can also be adjusted to reduce waste and cost benefiting both the electricity supplier and the customer.

In times of peak demand, delaying the start of all cycles or skipping one or more cycles allowing for temperature variation over a larger range can reduce energy usage considerably, with minimal impact to occupants. Once again, the staggering algorithms and prioritization of units can be based on both the thresholds as well as the type of establishment and occupancy. For example, nursing homes or health care facilities may have maximal priority for getting slots for cooling or heating. Unoccupied office spaces, storage spaces, and large industrial facilities may get lowest priority allowing a greater range of fluctuation.

Similarly, when usage valleys are detected, time shifting of cooling or heating may be accomplished to exceed the desired temperature by a degree or two. When falling back to the normal threshold setting after the valley is passed, it simply takes a longer period for the room to heat or cool to the preestablished threshold to start the next cycle.

The above examples, when applied to hot water heaters or to freezers and refrigerators, may have even more flexibility in adjusting temperature ranges. These insulated units will typically keep their temperature longer and will thus allow for a wider range of time shifting for cooling. Of course, in cases involving food safety or dishwashing water temperature limitations will be applied. A minimal hot water temperature must be maintained to promote safety when washing dishes or laundry. Additionally, cooling a refrigerator to the point of freezing food that is intended to be kept unfrozen would be avoided, as would defrosting food in a freezer. These limitations aside, it is possible to adjust temperatures to allow for flexibility in the setpoint ranges without affecting food quality or safety.

Another example of a device that can participate in such a system is a beverage cooler. These are standalone refrigeration units that are used to store iced tea, soft drinks, and other beverages. It is preferable to keep these operating at peak periods where doors may be opened more frequently, and customers are expecting chilled drinks. However, cooling at nonpeak periods could be adjusted to accommodate needs to manage energy peaks. Here, like the HVAC or typical fridge, the cooling cycle timing can be adjusted with minimal impact to the customer. At off periods, it is possible to let drinks warm to a higher temperature because unlike food items, drinks will not spoil at a slightly higher temperature. This could occur, for example, at times when the restaurant is closed. Allowing these units an extended range of temperature variance in turns allows the system to accommodate peaks and valleys.

Yet another example of such a device is an ice maker. Restaurants tend to go through ice at their peak periods, but this ice can be reasonably made hours in advance and there is sufficient storage of ice to allow for turning off the ice maker even at these busy times for a while. There is no immediate pressing need to make ice within a reasonably wide margin of time allowing the timing of the operating window to be adjusted to meet the demands of grid peaks and valleys.

The system could be applied to a variety of restaurant equipment including soup wells, heating lamps, roller grills, gyro machines, rotisserie units, sandwich toasters and so on. The width of the window that one can vary that energy consumption may vary, however start times may be altered even by a few seconds to delay the spike of peak energy use, so it does not coincide with a peak on the grid.

Taking yet another example, consider the deployment of smart dimming lights which can be centrally controlled. Such controls are increasingly available at low cost.

It is estimated that office lighting can consume between 20 and 40 percent of the electricity used. Additionally, the system could be used in connection with street lighting or other outdoor lighting.

One configuration of the present system could be used to control a relatively large numbers of dimmable lights controllable in real time from a central system, to 90-95% capacity at normal times. In times of usage valleys, the lights could be turned up to 100% and at times of peak demand the lights could be set to 80% or lower. The numbers are only used for illustrative purposes and can be adjusted based on the needs of the system.

In yet another example, variable speed motors are becoming increasingly popular as a way of reducing energy consumption. Rather than running motors at single speeds, these variable speed motors can reduce the motor consumption by running fans and pumps at a lower capacity thus saving electricity. Like the dimming of lights, these pumps and motors may have minimal perceived impacts. For example, a pool pump may circulate slightly less water at peak times or slightly more in valleys.

Consider now also how some residences and businesses have access to energy storage devices which are often used to offload peak demand. In a typical system, it could be decided to charge a battery when rates are lowest, and then discharge it, offsetting utilization, when rates are highest. In a typical system this may involve charging at night and discharging during the day. The timing of the discharge and charge cycle can also be managed to coincide with the peaks and valleys in the grid, rather than simply be done randomly within these day and night windows.

In all the examples above, whether on the supply side with battery storage or other devices, or on the demand side, namely HVAC, Hot water, refrigeration, various heating and cooling devices, lighting, and variable speed motors; when considering a large number of energy consumption events that can be time shifted, is possible to stagger these events over a time window to keep the energy consumption below a certain level reducing the peak.

Similarly, when dealing with a valley of usage and wanting to generate a matching peak to offset this valley, the opposite can be done. The key is the ability to tie the timing of these cycles to the current state of the grid. Another challenge is to allow for these adaptations without triggering existing billing models with the energy provider that are defined by these peaks.

The coordination and management of these peaks must be managed through a central management system that can accommodate several priority factors. For example, the class of service that includes essential services such as hospitals or food safety may have a higher priority than non-essential services. The timing of the last window may also play into a weighting system when determining which services are to take priority and which are to be resumed.

Rather than dumping excess capacity in these windows or valleys, the energy provider can now generate demand through these controls and sell the energy instead, which will offset later energy usage.

It is also important to manage the peaks and valleys not only from the standpoint of generation, but also from the loading of the transmission infrastructure. Looking once again to the analogy of cars on a highway, the transmission grid can be considered as the number of lanes on a highway and the speed limit. This is regulated by the number of power lines and their size and capacity to handle higher voltages. It is not possible to drive an infinite amount of power to a location experiencing a peak and as these limits are reached, it is increasingly important to be able to manage demand adjustments that are localized to portions of the grid where they are needed most. For this reason, managing demand in the same areas of the grid is of paramount importance as these limits are approached.

This type of system has not previously been attempted as the facilities grid (e.g., the electricity distribution in a facility after the utility metering) has traditionally been out of bounds for control and measurement by the utility as the equipment is owned by the enterprise or consumer. Further, the management of the devices would require buy in or permission from each of the end users as well as a standardization of interfaces.

In a preferred embodiment, a third party working with a unique model which allows a third-party entity to take over the energy management and manage the installation and monitoring of equipment on these sites is desirable. Such a system or network of clients makes for the critical mass required to make a sufficient impact and difference with the previously described micro adjustments on a large scale. Examples are disclosed in U.S. Pat. No. 10,916,968 and U.S. Patent Publication No. US-2021-0097565-A1, the contents of which are incorporated by reference herein.

Each site can operate with a facilities controller that includes a facility operation profile relating to the individual equipment/components at the facility and can accept the control directives for the site at any given time. The facility operation profile data can range from basic commands indicating a demand peak or a demand valley such that the controller independently operates to electricity usage accordingly. The facility operation profile data could also comprise initiating commands directly to a specific piece of equipment or component in the facility; or demanding a certain amount of reduction or increase from the facility. As an example, the central controller may instruct the facilities to reduce usage by 1 KW where the facilities controller then functions to reduce consumption according to its programming. If the facilities controller can comply with the instruction based on the facility operation profile, it can confirm the instruction. Alternatively, if the facilities controller is unable to comply with the instruction, a negative reply can be sent. Still further, if the if the facilities controller can partially comply with the instruction, data relating to that partial compliance can be transmitted.

It is expected that such a system would not operate in a similar manner as typical demand response systems that respond to peaks that occur during weather extremes. Rather, the present system would be constantly operating and adjusting to the demands of the grid in real time. This in turn can allow for the minimization or even elimination in some cases of the expensive peaker plants currently deployed to handle peak demands. It can also allow for the minimization and elimination of the need for dissipating of excess generated electricity in demand valleys. It can even allow the energy generation plants to run at a reduced capacity as the grid can adjust to usage dynamically eliminating the need to run with a large power buffer of available energy. In essence we are widening the operating range of the energy generation plant providing a built-in control that does not cost money (like the buffer) in the form of building out peaker plants, burning fuel, or creating unnecessary emissions.

When considering demand valleys, it is conceivable that a managed demand controlled by a third party could be used as a negotiating point to reduce energy rates for these valley periods as this energy would normally have to be wasted anyway. For the end user, the electrical power that is used stays essentially consistent, however due to the capability to time shift usage, it is conceivable that energy costs can be lowered considerably.

Further, even when looking at overall energy consumption, the ability to smooth out load factor for the location would reduce rates in the current billing framework. Additionally, such a system could be extended to smooth out usage overall on the grid providing what may be likened to the concept of improved load factor, but instead of a single entity, this smoothing can be done for neighboring energy customers as well.

In the case of a third party building out and managing the system, compensation may be provided directly to the third party managing the system based on the amount of extended range provided to the electric utility, where extended range includes the level of peaks and valleys that can be absorbed by the system, potentially by targeted territory. These incentives would be used to offset the cost of the remotely controllable equipment installed in the sites to allow for the remote control and management that allows the altering of timing windows to match the demands of the grid.

In return, the third party managing the end customers can offer reduced energy rates to the end customers. This can be further defined based on a level of participation. It is proposed that various levels, considered as eco-factor, various levels would be offered whereby the end customers desire to participate in the extended range offering to the grid would be compensated based on their level of participation.

As a first level of participation, equipment that has little to no impact to the end user can be controlled and managed. This could include adjustment of controls for defrost cycles and the like to match the energy supply in the grid. As stated previously, if the grid was experiencing a demand valley, the defrost cycle could be moved to an earlier time to utilize the spare energy provided at a lower energy rate.

As a second level of participation, minimally intrusive changes can be introduced. These could include the dynamic adjustment of temperature sensor settings for compressors, HVAC, and various heating elements. As described above, these may involve letting an HVAC bypass a setpoint for a degree or two at a time of peak demand or could include cycling heating or cooling cycle earlier/later during a demand valley or at least not during a peak demand time. It is conceivable that the range in degrees can also be set to various levels i.e., adjustment of up to ½ degree or a full degree and so on. The amount of latitude to adjust can be tied to a cost savings. In any event, a facility operation profile will set the allowable adjustments. Additional eco-factors with increasing levels of participation may include the remote dimming of lighting.

If the business model for such extended range for energy consumption is compensated by the energy supplier to the third party managing the facilities grid equipment, the incentives would be decoupled from the end customer. Initially, the cost of adding remotely controllable equipment as well as the ability to receive and act on when the grid is in peak demand and demand valley situations can only be accomplished by the third party responsible for the remote management. Further, since the overall smoothing of energy usage can extend to multiple end customers in multiple areas, the ability to compensate requires a combination of many facilities participating in the program. Therefore, the third-party management company may opt to offer differing incentive levels not only by level of participation for a facility, but also depending on how many others are participating in the local grid as well as the needs of a given subsection of the grid. It would be difficult to combine these factors into a simple billing model that can be offered directly from the energy supplier to the end customer. In any event, the incentives to further reduce the energy expense for these managed customers are expected to be sufficiently impactful to warrant their participation, especially at participation levels where customers will see little to no disruption or noticeable effects due to system operation.

Such a system is a win-win in that users will have reduced energy rates by smoothing usage and avoiding peaks while utilities will eliminate waste of dumping energy during valleys selling this energy instead as well as reducing overall peaks and potentially reducing the need for peaker plant capacity.

Referring now to the drawings, wherein like reference numerals designate corresponding structure throughout the views. The following examples are presented to further illustrate and explain the present invention and should not be taken as limiting in any regard.

As shown in FIG. 1 a facilities grid components overview is presented. A central control system (1) is provided, which includes data about the operation of the power grid and the current demands including peak demands and valleys of usage. Based on this information received from a utility computer, this allows the Central Control System (1) to transmit various commands via the cloud (2) to various facility locations (10,11,12).

At the various facility locations (10,11,12), consider facility location (10). A Facilities Controller (3) is provided, which includes facility operation profile data and is in communication through the cloud (2) with the central control system (1). Facilities controller (3) in turn communicates with devices (4, 5, 6, 7, 8, 9) that are present and controllable at the location (10).

Among the devices (4, 5, 6, 7, 8, 9) present, smart lighting systems (4) can be controlled via dimming as well as on/off functions and the activation of presence monitoring. Smart hot water heaters enable control of the water temperature as well as when to cycle heating, and smart thermostats (6) can dynamically modify setpoints to time shift heating and cooling cycles. Smart refrigeration (7) can alter defrost cycles and adjust setpoints within limits of food safety based on the facility operation profile data, and variable speed motors (8) can also adjust their speeds to increase or decrease electrical usage. Other smart controllers (9) can leverage the ability to increase or decrease electrical use as per their intended function without compromising safety or causing inconvenience to users by altering their intended purpose.

While only one site (10) is expanded in detail it is understood that other facility locations (11, 12) are controllable by one or more central control systems can be depicted or explained similarly. It will be further understood by those of skill in the art that many of each type of component (4, 5, 6, 7, 8, 9) and other controllable equipment may be provided at each facility location (10,11,12).

Figure 2:
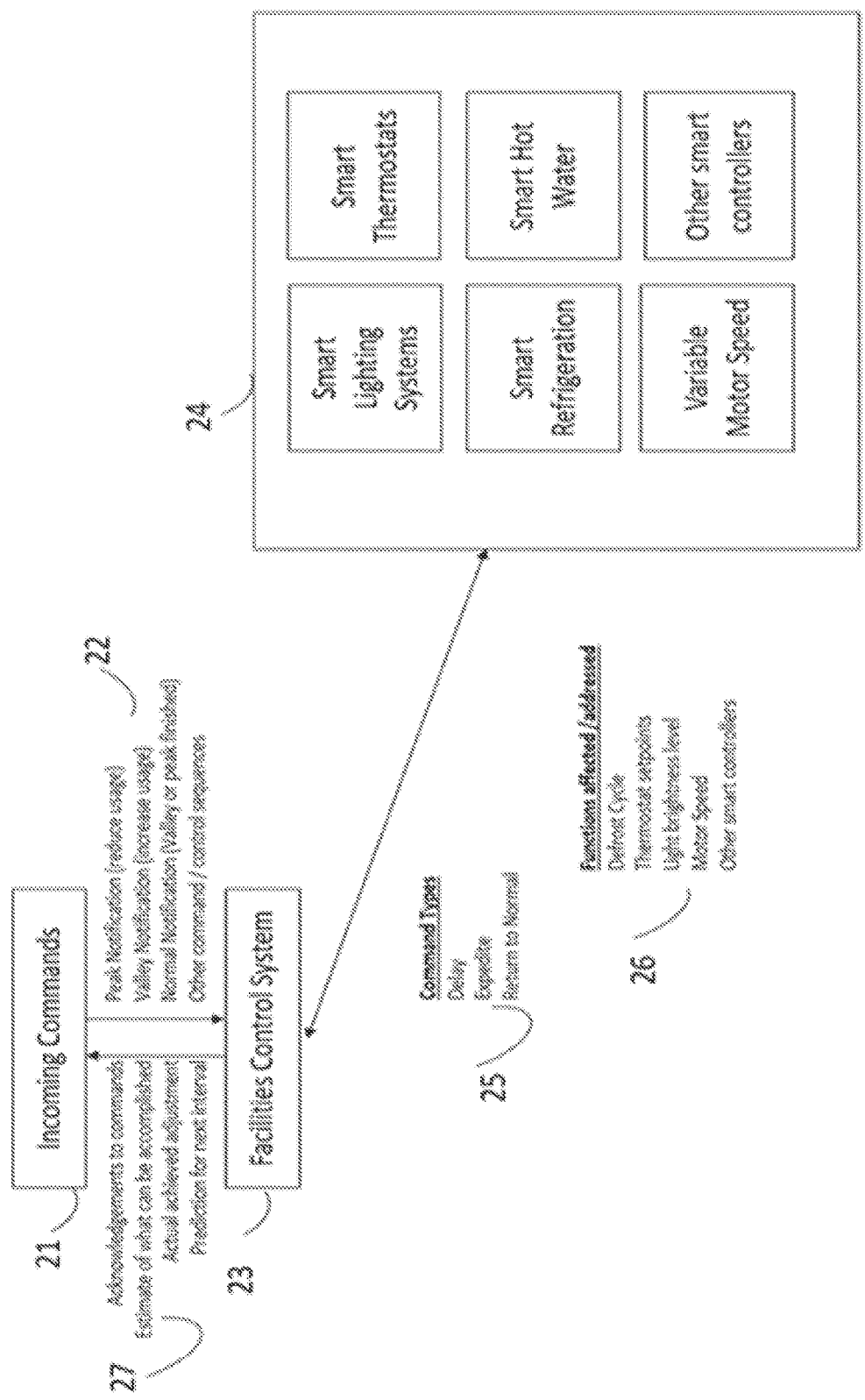
FIG. 2 is a functional diagram of some of the control commands used in the context of the facilities grid.

Turning now to FIG. 2, a facilities grid controller (23) is illustrated receiving command (22) from the central control system (21). These commands (22) may comprise information relating to the grid, such as, peak demand mode (i.e., a request to reduce usage), demand valley mode (i.e., a request to increase usage), or that the grid is in a normal demand mode (maintain/return to normal usage patterns). In addition, these commands (22) can also include control sequences to set communication preferences or other administrative tasks.

When the facilities control system (23) receives these incoming directives (22), it in turn issues commands to the controllable devices (24) under its control. These commands are specific to the type of device in question, but in general, they can be depicted as specific command types (25) including, delaying the functioning of the equipment or a particular function, expediting the functioning of the equipment or a particular function, or the returning to normal operation.

More specifically the types of functions controlled by the command types outlined above can vary depending on the equipment being controlled. For example (26), for a smart refrigeration unit, these may apply to a defrost cycle. For a HVAC unit or a hot water heater these may apply to setpoints. For lights these may apply to brightness levels and for motors these may apply to a percentage of normal operating speed.

In addition, in response to these commands (22) the facilities controller (23) may issue responses (27), which includes data on how much energy can be delayed or absorbed, as well as actual power absorbed or delayed in response to a request. These measurements are utilized in any proposed billing model that includes compensation for the extended range provided.

Figure 3:
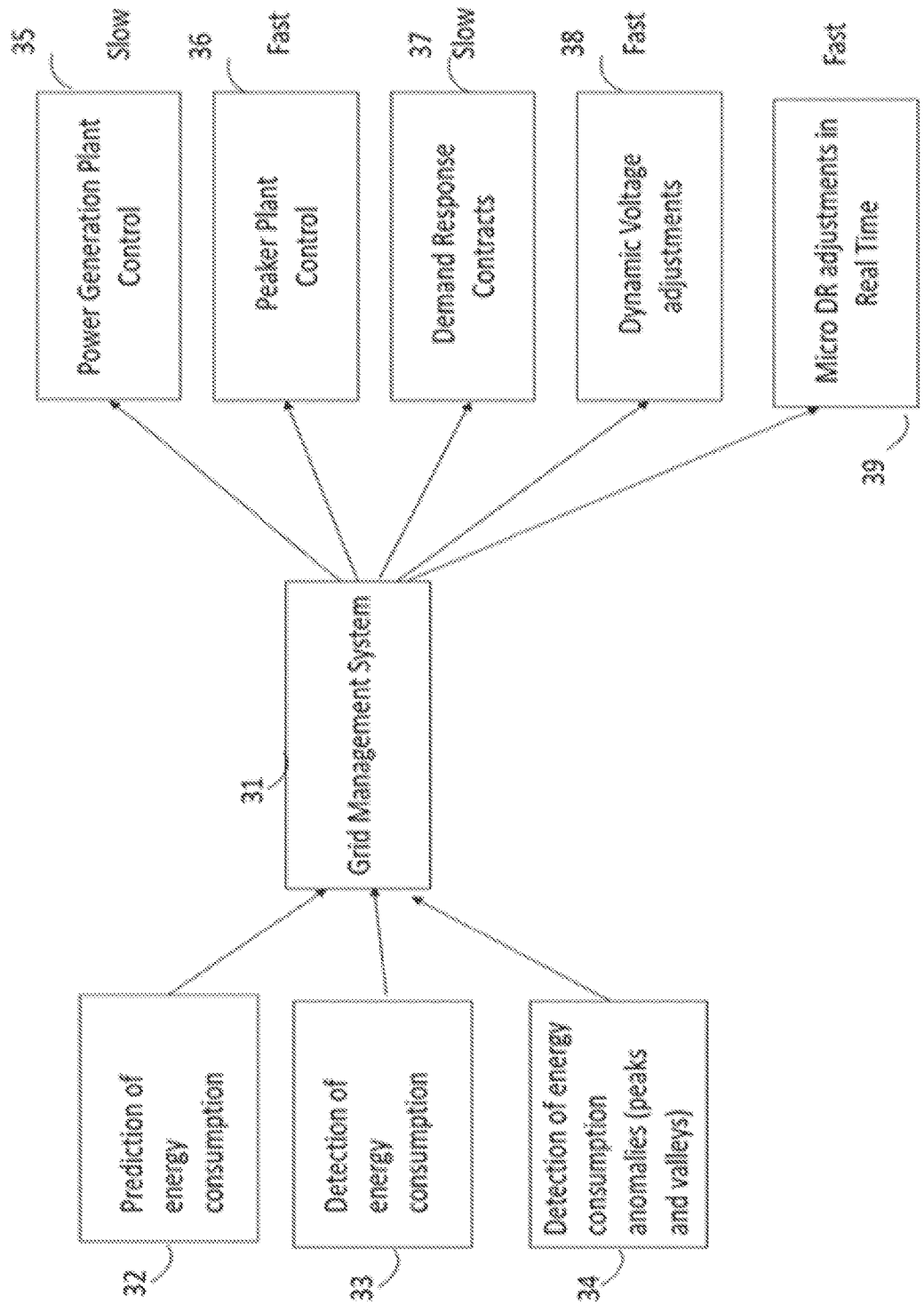
FIG. 3 is an example of grid detection functions as well as functions that can be used to adjust power on the grid.

Turning now to FIG. 3 an example grid with components that can be used to detect and manage energy fluctuations is illustrated. A Grid Management system (31) is designed to predict energy consumption (32). This may be done through historical data, weather forecasts and other intelligence/information about expected usage. The Grid Management System (31) is also designed to detect energy consumption (33) by the monitoring of load on the system. Under normal circumstances this ability can be used to adjust power generation.

The Grid Management System (31) is also designed to detect anomalies (34) in peaks and valleys in the grid. This ability may detect relatively sudden increases to load that were not anticipated and may require rapid adjustments.

In terms of adjustments to the power utilization, the ability for the Grid Management System (31) is limited and can vary in the response time. Power Generation Plant adjustments (35) are relatively slow, although adjusting the power to a turbine can be done within certain limits. Peaker plant control (36) is relatively fast, in that these peaker plants are generally running at idle in case more power is needed and are then turned up to speed to generate this power as needed.

Demand response contracts (37) are typically slow. While the timing can vary, these typically comprise a contract negotiated in advance with various large consumers with the expectation that some of the consumers will adjust various equipment when requested to receive the benefits outlined in the contract. However, this may require hours or days of notice to accomplish.

Dynamic voltage adjustments (38) can be made quickly however regulatory norms for quality must be adhered to and this can only provide very limited adjustment capability.

Micro demand response adjustments (39) are an overview of peaks and valleys and how the micro demand response system can add further range to electric utilities to handle load variations. These are a way to adjust to both peaks and valleys and can react in near real time to changing situations on the power grid.

Figure 4:
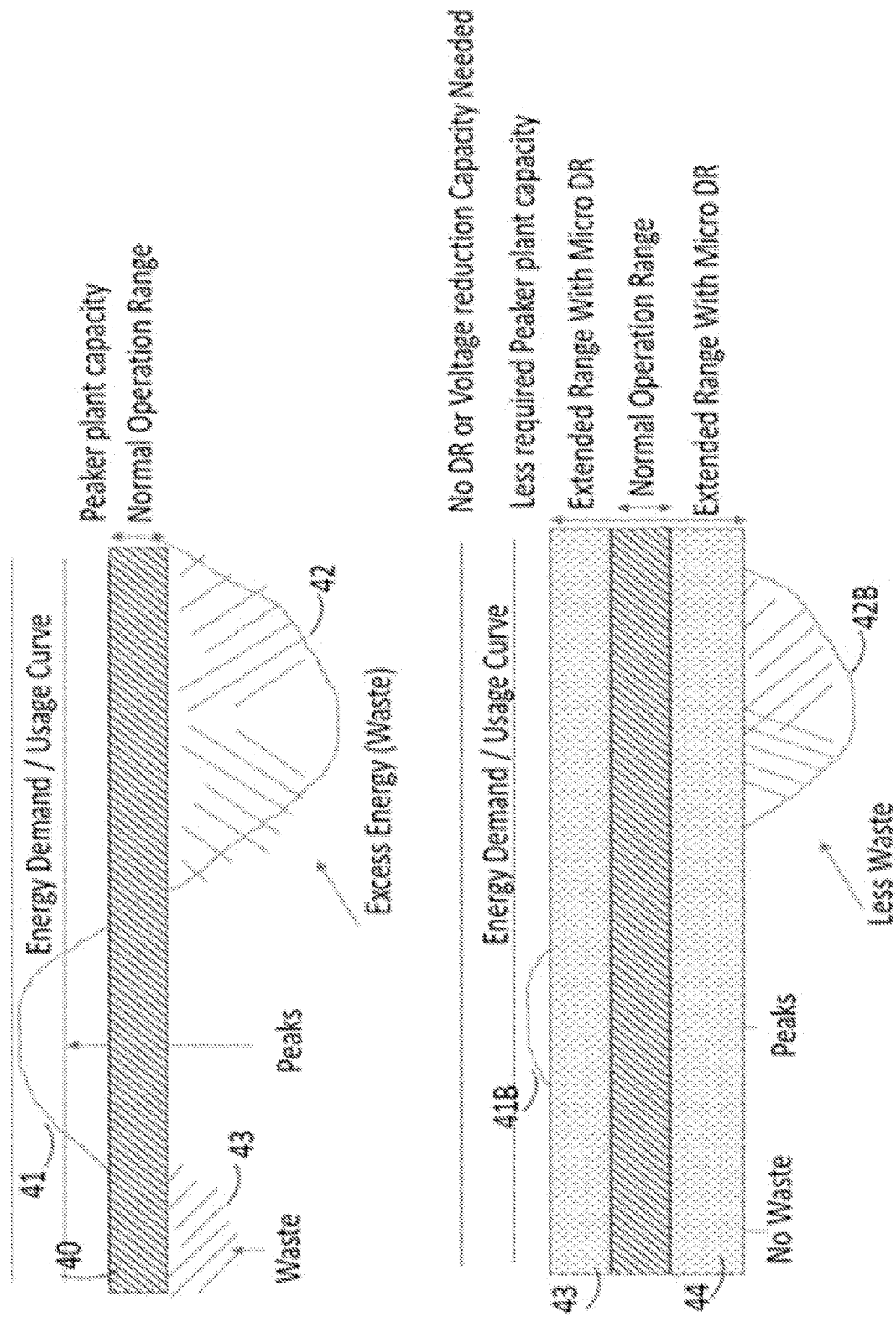
FIG. 4 is a depiction showing how micro adjustments in the facilities grid provide an extended operating range for and associated utility providing power to the facility.

Turning now to FIG. 4 an example grid with components that can be used to detect and manage energy fluctuations is illustrated.

A representative energy use curve (40) is provided showing consumption over time. Peaks (41) of energy use as well as valleys (42) are shown in the representative graph. Also, the typical capacity (40) of a peaker plan is shown in terms of how much energy can be supplied as quick demand response.

The second drawing superimposing additional ranges shows (43) the extra range to provide energy at peak times as well as (44) the ability to absorb excess energy. The areas of the curves for the valley (42) shown above and the peak (41) are greatly reduced and shown in 41B and 42B.

Figure 5:
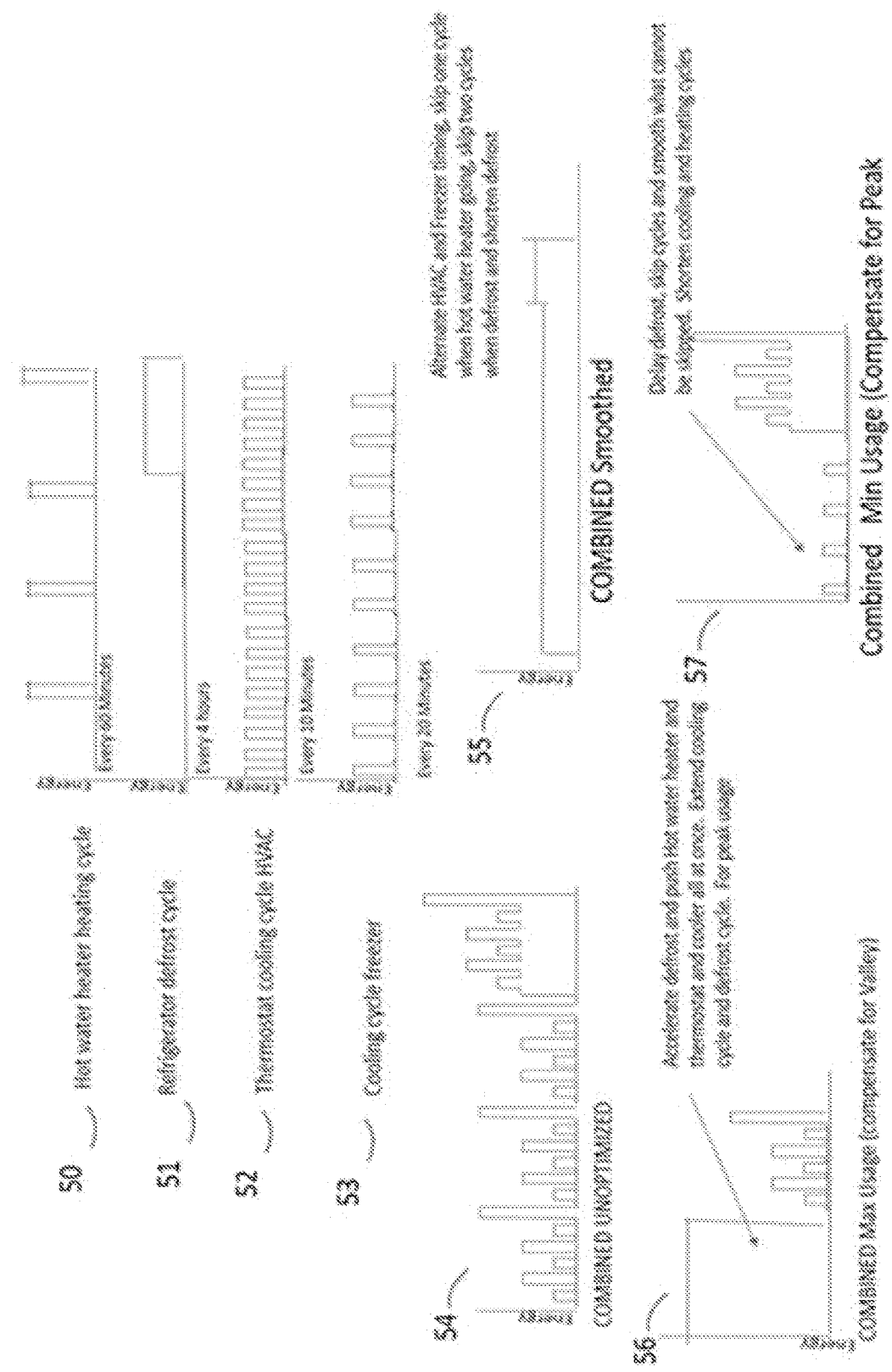
FIG. 5 shows how the electrical usage patterns of individual components can be controlled to allow for absorption of peaks and valleys in the grid.

Turning now to FIG. 5 additional examples of how altered timing through remote control can change peaks and valleys of energy user are illustrated.

First, a number of separate energy usage curves are mapped such as, a hot water heating cycle (50), a refrigerator defrost cycle (51), a thermostat cooling cycle (52) and a freezer cooling cycle (53). These are some typical equipment types that may be found at a facility to be optimized.

With no coordination, these individual usage curves are shown in a combined curve (54), which shows the resultant mapping of power usage. Note the large peaks near the end of the curve. Conversely, when smoothing out the curve (55) decisions are made to shift the time of the power usage so that a lower consistent peak is realized. This is the result of minimizing power usage at times to reduce demand peaks through dynamic micro adjustments.

Also illustrated at graph (56) is a situation where the system combines power usage of the available equipment to provide larger power usage when this is advantageous for the electric utility to compensate for a demand valley. Also shown at graph (57) is an example of adjusting for minimum power usage at a given time, or maximum use (56) by changing the timing of energy consuming events.

In accordance with one configuration, a device is provided that includes the ability to detect demand peaks and demand valleys in the grid including the location of such peaks and valleys within portions of the power grid. This system in turn, communicates this information to managed facilities controllers, which in turn, are designed to make real time adjustments to equipment located at or associated with the facility controller to dynamically compensate for the variations on the power grid. These facilities controllers in turn manage devices under their control to make possible reductions or increases in power based on live data of the operation of the equipment, live data relating to the status of the facility, and the facility operation profile including operating parameters for the facility equipment. Based on the information available to the facility controller, a data may be transmitted to the electric utility computer that sent the request for adjustment.

In accordance with another configuration, a device is provided that includes the ability respond back directly to a central management system whereby no facilities controller is required. In other words, a controller is provided with each piece of equipment that can communicate directly with an electric utility computer without the need of an intervening facility controller.

It is contemplated that the components in the present system will further include an API to the electric utility computer allowing for demand reductions or increases in demand within a given time frame (e.g., immediately or within a particular amount of elapsed time), Including a duration and a magnitude for these requested adjustments.

The system may in one configuration, respond with an adjustment response information including how much the system can adjust equipment in the facility based on the current information available to the facility controller.

It is further appreciated that billing models are provided with rates that incentivize participation whether for decreasing or increasing demand.

Figure 6:
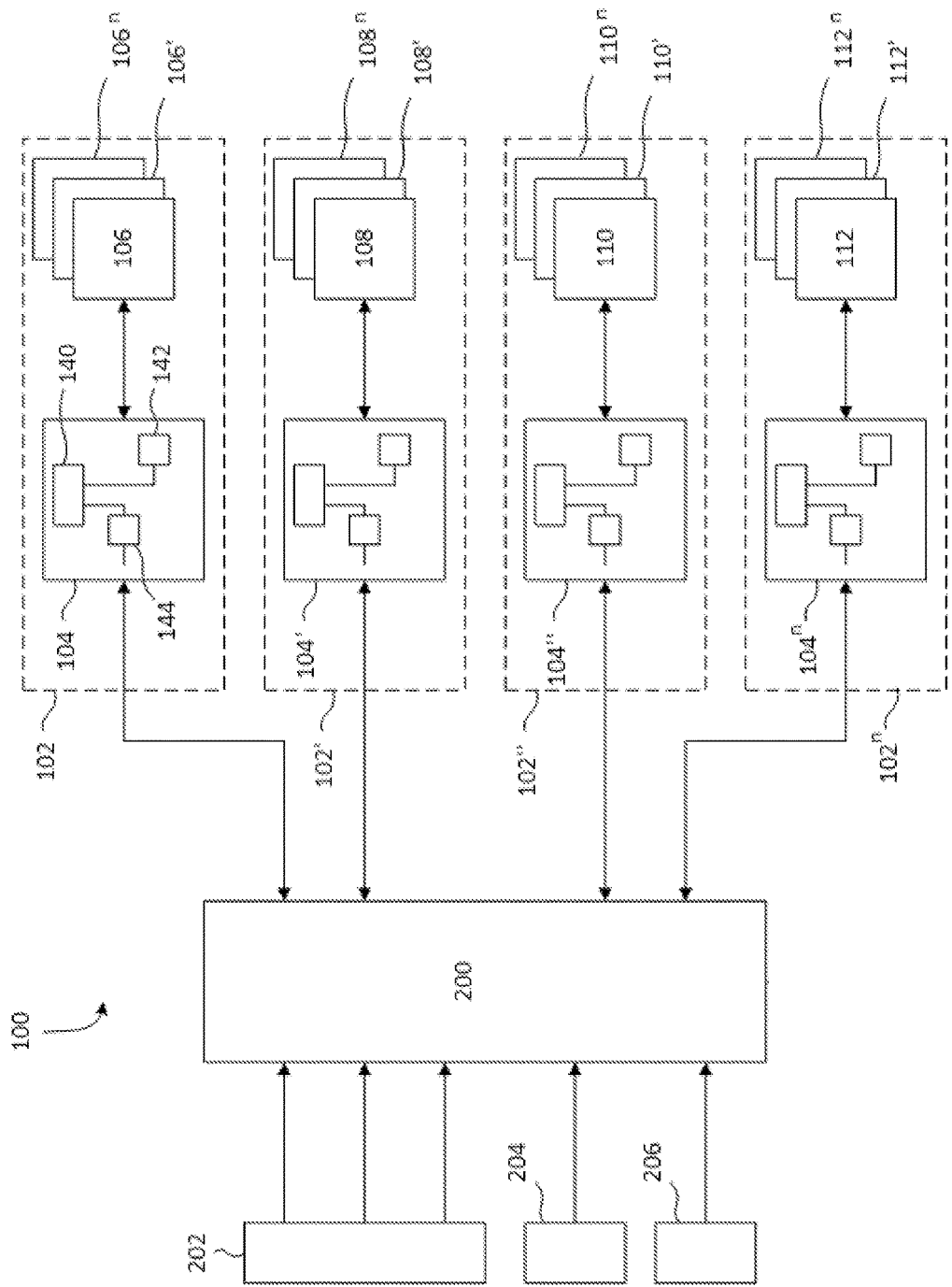
FIG. 6 is a functional block diagram of the system according to FIG. 1.

Turning now to FIG. 6, a functional block diagram is provided illustrating various components of the system 100 for dynamically adjusting load on a power grid. The system 100 includes various facility controllers 104, 104', 104", 104n that are located at various facilities 102, 102', 102", 102n connected to a power grid (not shown). It will be understood by those of skill in the art that the various facilities 102, 102', 102", 102n may be connected to different sections or portions of the power grid.

Each of the various facility controllers 104, 104', 104", 104n are connected to various equipment (106, 106', 106n, 108, 108', 108n, 110, 110', 110n, 112, 112', 112n) located at each facility 102, 102', 102", 102n respectively. The equipment may comprise any of the equipment previously discussed in the specification. Additionally, it will be understood that while only three are illustrated in FIG. 6, virtually any number of discrete pieces of equipment can effectively be connected to a respective facility controller 104, 104', 104", 104n.

Each of the facility controllers 104, 104', 104", 104n. are connected to an electric utility computer 200. The electric utility computer 200 may have any number of inputs including, but not limited to, various load sensors 202 providing measurement data relating to demand on portions of the power grid, historical data 204 relating to historical peak demands and demand valleys, other data 206 relating to planned changes to facilities connected to the power grid along with the expected impact to the power grid, as well as capacity and expansion data relating to the status of peaker plants or alternative sources of power that could be added to the power grid or data relating to excess power that could be sold from the power grid to, for example, other power grids.

Each of the facility controllers 104, 104', 104", 104n may be provided as computer having, for example, a CPU 140 and having software programming executing thereon, a storage 142 coupled to the CPU having software saved thereon in addition to the facility operation profile for the facility the controller is associated with. A communications interface 144 may also be provided in each controller that allows the facility controller to communicate with the electric utility computer 200 and the various pieces of equipment located at the respective facility.

It should be noted that while FIG. 6 shows a single controller for each facility, each piece of equipment in a facility could be provided with communications capabilities to communicate directly with the electric utility computer 200. In one configuration, a controller could be provided integral or in the vicinity of each piece of equipment. In another configuration, each piece of equipment may be provided with communication capabilities to communicate directly with the electric utility computer 200 and a central facility computer is also accessible by the electric utility computer 200 that provides status information to the electric utility computer 200 relating to the status of the facility, however, direct control of the equipment is available to the electric utility computer 200. Further, it will be understood by those of skill in the art that while one electric utility computer 200 is illustrated in FIG. 6, many computers in communication to each other could make up the electric utility computer 200 and a number of discrete controllers could make up a facility controller 104.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for dynamically adjusting load on a power grid comprising:
  a computer having a storage and connected to a network;
  a plurality of control devices connected to said network and coupled to said computer, the plurality of control devices associated with equipment located at different facilities located geographically apart from each other and connected to the power grid, each facility having an electric metering device to measure an amount of electricity used at the facility;
  wherein software executes on said computer associating each of the plurality of control devices with equipment located at one of the different facilities;
  wherein each control device is connected to an electric power line supplying electrical power to the equipment the control device is associated with such that a control device is capable of adjusting the power supplied to its associated equipment;

said software receiving target instantaneous power usage (TIPU) data for the power grid from an electric utility computer that is indicative of a desired instantaneous power usage on the power grid, the TIPU data including a range of power consumption;

said software receiving actual instantaneous power usage (AIPU) data for the power grid from the electric utility computer, the AIPU data received on a real time or near real time basis by the computer;

said software executing on said computer transmitting control signals to the control devices to modify electrical power usage of at least two pieces of equipment each piece of equipment located at different facilities, such that power usage on the power grid is modified according to the TIPU data and AIPU data.

2. The system according to claim 1, wherein the TIPU data is calculated as a total desired instantaneous power usage on the power grid.

3. The system according to claim 2, wherein the modification of the electrical power usage of the at least two piece of equipment further includes turning off or decreasing power usage of the at least two pieces of equipment.

4. The system according to claim 2, wherein the modification of the electrical power usage of the at least two pieces of equipment further includes turning on or increasing power usage of the at least two pieces of equipment.

5. The system according to claim 1, wherein the TIPU data further comprises first TIPU data for a first portion of the power grid and second TIPU data for a second portion of the power grid, where the at two pieces of equipment comprise first and second pieces of equipment and the first piece of equipment is connected to the first portion of the power grid and the second piece of equipment is connected to the second portion of the power grid.

6. The system according to claim 5, wherein the modification of the electrical power usage of the at least two pieces of equipment further includes turning off or decreasing power usage of the first piece of equipment and turning on or increasing power usage of the second piece of equipment.

7. The system according to claim 1, wherein said software executing on said computer comprises artificial intelligence that learns the electrical power usage of the power grid and learns the electrical power usage of the equipment associated with the plurality of control devices, wherein said software controls the equipment to maintain an actual electrical power usage of the equipment within a range.

8. A method to enable modification of a power generation buffer for a power grid by modifying power usage of a plurality of equipment located at a plurality of locations with a computer having software executing thereon and coupled to a network, the method comprising the steps of:

coupling a first control device between a first piece of equipment at a first facility and a first electrical power distribution source coupled to the power grid, the first control device connected to the network;

coupling a second control device between a second piece of equipment at a second facility a second electrical power distribution source coupled to the power grid, the second control device connected to the network;

associating the first control device with the first facility and associating the second control device with the second facility;

receiving target instantaneous power usage (TIPU) data for the power grid from an electric utility computer, the TIPU data indicative of a desired instantaneous power usage on the power grid, the TIPU data including a range of power consumption;

receiving actual instantaneous power usage (AIPU) data for the power grid from an electric utility computer, the AIPU data received on a real time or near real time basis by the computer;

automatically controlling the equipment associated with the first and second control devices according to the TIPU data and the AIPU data such that actual power usage on the power grid is modified to be maintained within the range of power consumption included in the TIPU data.

9. The method of claim 8, wherein the TIPU data is based on an electric generation capacity of the electric utility.

10. The method of claim 8, further comprising the steps of:

providing a plurality of control devices associated with a plurality of equipment at the first facility, where each piece of equipment has a control device coupled between the first electrical power distribution source and the piece of equipment, each of the plurality of control devices connected to the network;

providing a plurality of control devices associated with a plurality of equipment at the second facility, where each piece of equipment has a control device coupled between the second electrical power distribution source and the piece of equipment, each of the plurality of control devices connected to the network;

controlling the plurality of equipment at the first facility based on the TIPU data, the AIPU data and a first facility operation profile specifying conditions and limits on instantaneous electrical usage modification of the plurality of equipment at the first facility and based on the target power usage;

controlling the plurality of equipment at the second facility based on the TIPU data, the AIPU data and a second facility operation profile specifying conditions and limits on instantaneous electrical usage modification of the plurality of equipment at the second facility and based on the target power usage.

11. The method of claim 10, wherein the first and second facility operation profiles include data relating to operation of the respective plurality of equipment selected from the group consisting of:

a time of operation, a date of operation, a magnitude of operation, a speed of operation, a temperature setpoint, a scheduled equipment operation, an illumination level, and combinations thereof.

12. The method according to claim 8, wherein the step of controlling the first and second pieces of equipment further comprise:

turning off or decreasing power usage of the first and second pieces of equipment.

13. The method according to claim 8, wherein the step of controlling the first and second pieces of equipment further comprise:

turning on or increasing power usage of the first and second pieces of equipment.

14. The method according to claim 8, wherein the TIPU data further comprises first TIPU data for a first portion of the power grid and a second TIPU data for a second portion of the power grid, and the first facility is connected to the first portion of the power grid and the second facility is connected to the second portion of the power grid, wherein the step of controlling the first and second pieces of equipment further comprise:

turning off or decreasing power usage of the first piece of equipment and turning on or increasing power usage of the second piece of equipment.

15. The method according to claim 8, further comprising the steps of:
receiving a request from the electric utility computer to increase instantaneous electrical usage by a specified amount;
transmitting control data to the first control device and the second control device indicative of modifying the operation of the first piece of equipment and the second piece of equipment respectively;
receiving a reduced electric rate from the electric utility based on the increase of usage of electricity.

16. The method of claim 15, wherein the request to increase instantaneous electrical usage is for a set time period.

\* \* \* \* \*